(12) United States Patent
Bunlusin et al.

(10) Patent No.: US 8,261,432 B2
(45) Date of Patent: Sep. 11, 2012

(54) DISK SPACER DROP-PROOFING TOOL FOR DISK REMOVAL PROCESS

(75) Inventors: Kesirin Bunlusin, Ubon Ratchathani (TH); Khetrat Dateprasertkul, Surat Thani (TH)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1017 days.

(21) Appl. No.: 12/179,488

(22) Filed: Jul. 24, 2008

(65) Prior Publication Data

US 2010/0018042 A1  Jan. 28, 2010

(51) Int. Cl.
  *B23P 19/00* (2006.01)
(52) U.S. Cl. .................. 29/762; 29/759; 29/760; 29/743
(58) Field of Classification Search .............. 29/759, 29/762, 760, 603.04, 564.1, 603.17, 737, 29/743, 603.02, 603.03, 764; 360/98.08, 360/98.01, 99.12, 244.5, 244.6
See application file for complete search history.

(56) References Cited

U.S. PATENT DOCUMENTS

| | | | |
|---|---|---|---|
| 4,458,278 A | 7/1984 | Maclay et al. | |
| 4,502,136 A | 2/1985 | Rickert et al. | |
| 5,056,082 A | 10/1991 | Ekhoff | |
| 5,072,321 A | 12/1991 | Kanai et al. | |
| 5,486,962 A | 1/1996 | Boutaghou | |
| 5,533,811 A * | 7/1996 | Polch et al. | 384/107 |
| 5,923,498 A * | 7/1999 | Moir et al. | 360/98.08 |
| 6,102,777 A * | 8/2000 | Duescher et al. | 451/36 |
| 6,532,150 B2 | 3/2003 | Sivertsen et al. | |
| 6,805,238 B2 | 10/2004 | Iandoli et al. | |
| 6,838,795 B2 * | 1/2005 | Kloeppel et al. | 310/90 |
| 6,874,219 B2 * | 4/2005 | Hanssen et al. | 29/525.11 |
| 6,877,215 B2 * | 4/2005 | Pfeiffer | 29/729 |
| 7,032,232 B2 * | 4/2006 | Russ | 720/719 |
| 7,149,081 B2 | 12/2006 | Chen et al. | |
| 7,242,554 B1 | 7/2007 | Lin | |
| 7,295,002 B2 | 11/2007 | Guzik et al. | |
| 2005/0185331 A1 | 8/2005 | Ito | |

OTHER PUBLICATIONS

Maxupgrades, "MaxConnect Lite CPU Bay Disk Drive Mounting Assembly [PolyAcetal] for G5 Power Macs (PCI-X)", http://www.maxupgrades.com/istore/index.cfm?fuseaction=product_ID=136, (2007),1-3.

Mohite, Sunil "Disassembly Analysis, Material Composition Analysis and Environmental Impact Assessment of Computer Disk Drives", http://repositories.tdl.org/handle/2346/1210, (Sep. 5, 2006), 1-2.

8E6 Technologies, "ER Attached Storage: SATABeast SAN Unit", *8e6Technologies*_http://www.8e6.com/docs/gsg/06-09/ersatagsg2006.pdf, (2006),1-26.

* cited by examiner

*Primary Examiner* — Derris Banks
*Assistant Examiner* — Tai Nguyen

(57) ABSTRACT

An apparatus for removal of a disk in a disk stack. The apparatus includes a shaft. The shaft has an end portion insertable into a disk remover tool. The shaft has a positioning portion at an end of the shaft opposite the insertable end portion. The positioning portion includes a surface de-tensionizer. The surface de-tensionizer provides disengagement of surface tension between the disk and a disk spacer during a disk removal process performed thereon.

4 Claims, 17 Drawing Sheets

400

400

500

650

DISK SPACER DROP-PROOFING TOOL FOR DISK REMOVAL PROCESS

TECHNICAL FIELD

The invention relates to the field of disk devices.

BACKGROUND ART

Many electronic consumer products, e.g., computer systems, entertainment devices, communication devices, automobiles, etc., have numerous electronic devices and components disposed therewithin. Functions performed by the various components can include, but is not limited to, document manipulation, printing and data storage, video and audio playback, communication functions, etc.

For example, a computer system or other electronic system may utilize a hard disk drive that includes, in part, a stacked assembly of magnetic hard disks or drives within an outer housing or base containing a spindle motor assembly having a central drive hub that rotates the disks. Within the disk stack assembly, disk spacers are interposed between the hard disks, providing clearance for read/write head motion.

There are varied instances when disassembly of a hard disk drive is required, e.g., for repair, for data recovery, for failure analysis or other reason. In conjunction with a hard disk drive disassembly process, a process for removal of hard disks may be performed.

It has been observed that during hard disk removal processes, instances of hard disk damage may occur as a result of disk spacer drop.

SUMMARY OF THE INVENTION

An apparatus and method for disk spacer drop-proofing during disk removal are described.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Although embodiments of the present invention will be described in conjunction with a hard disk drive, it is understood that the embodiments described herein are useful outside of the art of hard disk drives, such as other devices that employ one or more disks having spacers interposed there between. A disk spacer drop-proofing tool, as applied to a hard disk drive, is an example of embodiments of the present invention and is provided herein merely for purposes of brevity and clarity.

Figure 1:
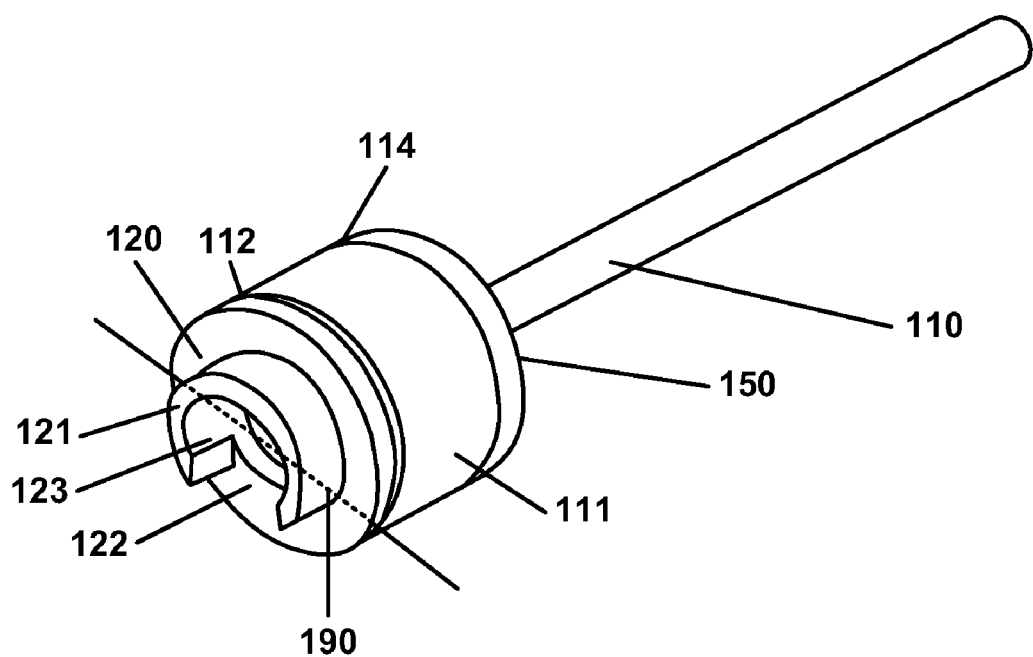
FIG. 1 is an illustration of a positioning pin in accordance with an embodiment of the present invention.

FIG. 1 is a diagram of a positioning aligning pin (PAP) 100 for utilization in a disk removal tool in conjunction with a disk removal process, in accordance with an embodiment of the present invention. PAP 100 is shown to include a shaft 110 portion and a piston 150 portion. Shaft 110 is configured for removably retained interoperability with a disk removing mechanism, e.g., disk removing tool 400 of FIGS. 3, 4A, 4B, 6A-6E, in an embodiment of the present invention. Although shaft 110, as well as shafts 210 and 310 of FIGS. 2 and 3, respectively, are shown as having an elongated cylindrical shape, it is noted that shafts 110, 210, and 310 may be an alternative shape or configuration, provided the alternative shape or configuration is compatible with a shaft retention mechanism (not shown) disposed within a disk removal tool, e.g., disk removal tool 400 of FIGS. 3, 4A, 4B and FIGS. 6A-6E, and into which shaft 110, 210 or 310 may be removably inserted.

Piston portion 150, coupled to shaft 110, is configured for alignment with a central hub of a hard disk drive, e.g., central drive hub 540 of HDD 500 of FIG. 5A-5E and FIGS. 6A-6E, in an embodiment of the present invention. Piston portion 150 is shown having a cylindrical shape 111 with an outer diameter 190 that is substantially equivalent to the outer diameter 590 of central drive hub 540 of FIG. 5A and from which hard disks are to be removed, in an embodiment of the present invention. Shape 111 of piston portion 150 of PAP 100, configured for positive alignment with an existing central drive hub 540, provides reorientation of a disk spacer 552 to a pre-disk removal position during removal of a hard disk 550. In the present invention, outer diameter 190 of shape 111 is also compatible with the inner diameter 490 of inner sleeve 450 of disk removal tool 400, as shown in FIGS. 3, 5A-5E and 6A-6E, in an embodiment of the present invention.

In an alternative embodiment, piston portion 150 may have a cylindrical shape 111 with an outer diameter 190 that is microscopically larger than the outer diameter 590 of the central drive hub 540. In the present embodiment, a PAP 100 having an outer diameter 190 larger than the outer diameter 590 of spindle hub 540 generates additional friction associated with the removal process. In yet another alternative embodiment, piston portion 150 may have an outer diameter 190 that is smaller than the outer diameter 590 of central drive hub 540.

Piston portion 150 of PAP 100 of FIG. 1 is shown to have integrated there within a plurality of indentations or troughs, e.g., groove 112 and groove 114, in an embodiment of the present invention. Groove 112 and groove 114 are shown circumferentially disposed within shape 111 of piston portion 150, in an embodiment of the present invention. In an embodiment of the present invention, groove 112 width is substantially equivalent to a thickness of a hard disk 550 that is subject to a removal process. In alternative embodiments of the present invention, the width of groove 112 may be larger or smaller than a thickness of a hard disk 550. Groove 112 provides for separation of a hard disk 550 from a disk spacer 552 in HDD 500 during a hard disk removal process performed on HDD 500, in an embodiment of the present invention. In the present embodiment, groove 114 provides for redundant separation of hard disk 550 from disk space 552.

Figure 5A:
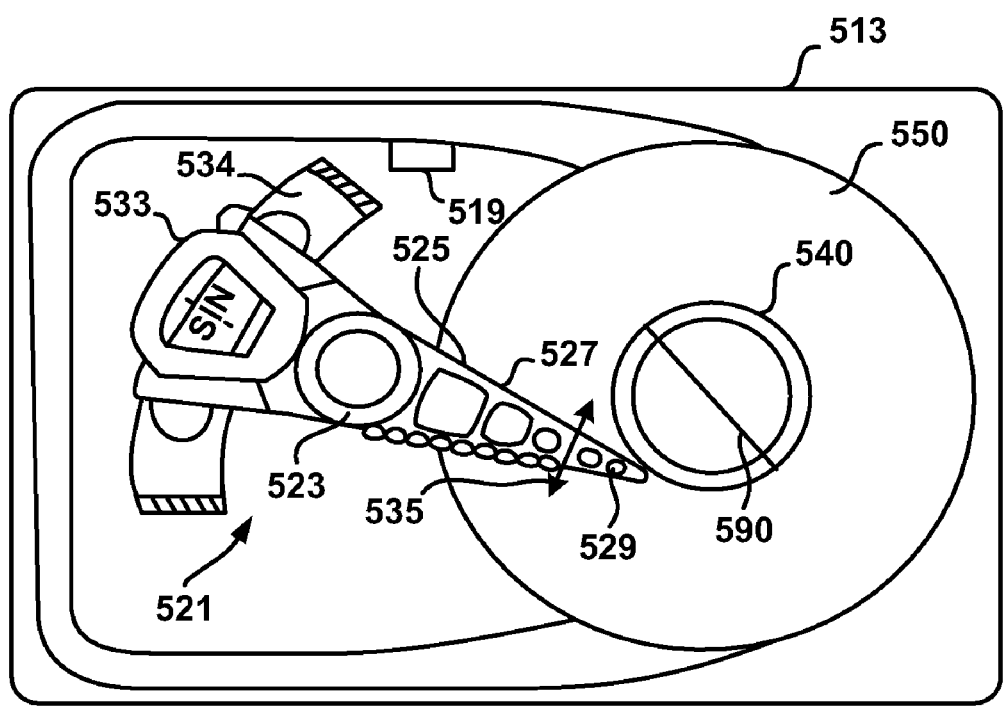
FIG. 5A is a plan view of a hard disk drive (HDD) upon which embodiments of the present invention may be practiced.
Figure 5B:
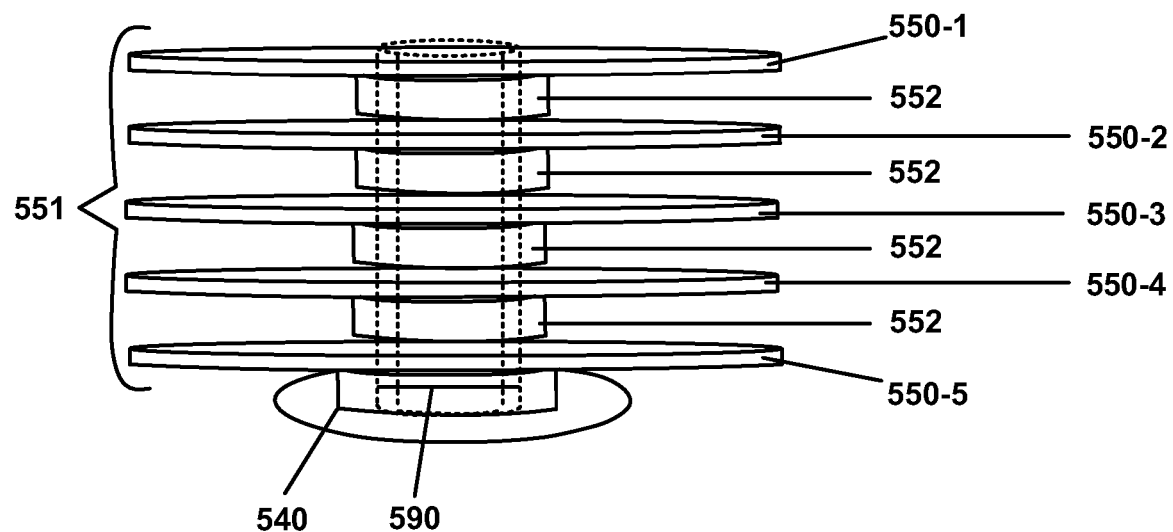
FIG. 5B is a profile view of an exemplary disk stack assembly that may be disposed in the HDD of FIG. 5A, and upon which embodiments of the present invention may be practiced.
Figure 5C:
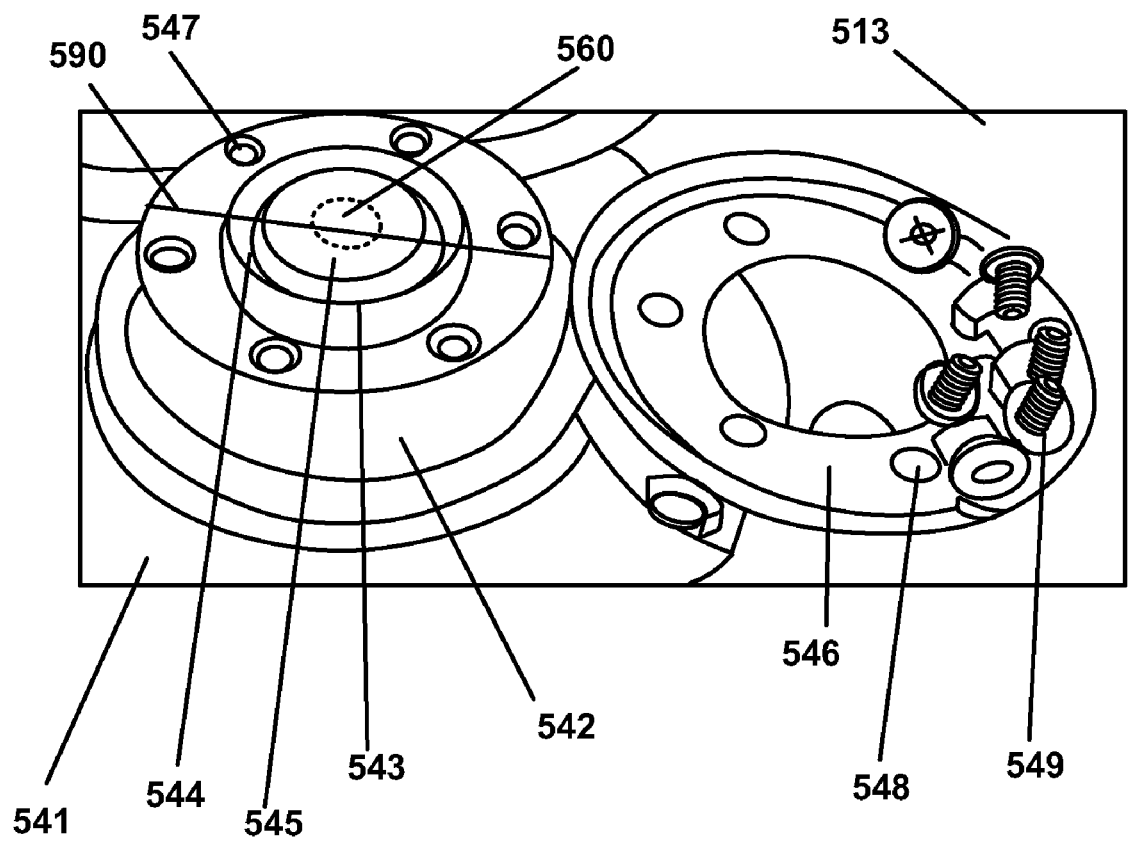
FIG. 5C is an angled view of exemplary spindle components within the disk stack assembly of FIG. 5A, and upon which embodiments of the present invention may be practiced.

Piston portion 150 of positioning alignment pin 100 is shown to further include a surface 180 that is configured for contacting a surface of central spindle hub, e.g., surface 580 of FIG. 5C, during a disk removal process, in an embodiment of the present invention. Piston portion 150 is shown to also include an open ended cylindrically shaped hollow extension, e.g., structure 181, which provides alignment of PAP 100 with a central drive hub 540 of an HDD 500 during a disk removal process performed thereon, in an embodiment of the present invention.

Structure 181 of FIG. 1 is shown to include a hollow 183 within the inner circumference of structure 181, in an embodiment of the present invention. In the present embodiment, structure 181 is further shown to include a void 182. Structure 181 is configured for utilization with a central drive hub 540 of FIG. 5C in an embodiment of the present invention. In the present embodiment, structure 181 is configured for insertion in opening 581 of central drive hub 540 of FIG. 5C. Hollow 183 is configured to receive portion 583 of central drive hub 540 of FIG. 5C. In alternative embodiments of the present invention, structure 181 may be generically configured for utilization with a variety of central drive hub assemblies.

Figure 2:
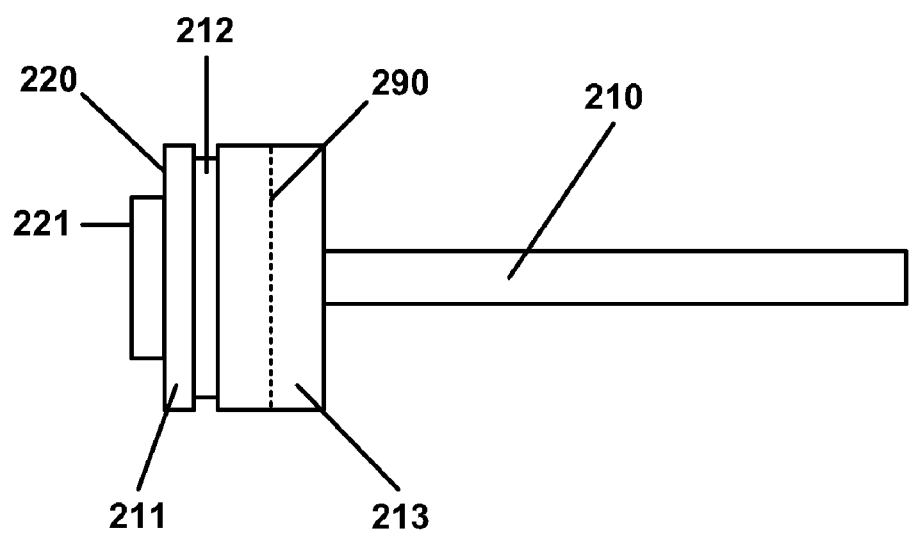
FIG. 2 is a profile illustration of another positioning pin in accordance with an embodiment of the present invention.

FIG. 2 is a profile view of a positioning aligning pin (PAP) 200, in another embodiment of the present invention. PAP 200 is functionally similar to PAP 100 of FIG. 1 in that PAP 200 is shown to include a shaft 210 portion and a piston 250 portion. Shaft 210 is configured for removably retained interoperability with a disk removing mechanism, e.g., disk remover 400 of FIGS. 3, 4A, 4B, 6A-6E, in an embodiment of the present invention.

Piston portion 250, coupled to shaft 210, is configured for alignment with a central drive hub of a hard disk drive, e.g., central drive hub 540 of HDD 500 of FIG. 5A-5E and FIGS. 6A-6E and FIG. 7, when hub 540 is configured with a non-protruding portion 583, in an embodiment of the present invention. Piston portion 250 is shown having a cylindrical shape 211 with an outer diameter 290 that is substantially equivalent to the outer diameter 590 of central drive hub 540 of FIG. 5A, and from which hard disks are to be removed, in an embodiment of the present invention. Shape 211 of piston portion 250 of PAP 200, configured for positive alignment with an existing central spindle hub 540, provides reorientation of a disk spacer 552 to a pre-disk removal position during removal of a hard disk 550, in an embodiment of the present invention. In the present invention, outer diameter 290 of shape 211 is also compatible with an inner diameter 490 of inner sleeve 450 of disk removal tool 400, as shown in FIGS. 3, 5A-5E and 6A-6E, in an embodiment of the present invention.

Piston portion 250 of PAP 200 of FIG. 2 is shown to have integrated there within an indentation or trough, e.g., groove 212, in an embodiment of the present invention. Groove 212 is shown circumferentially disposed within shape 211 of piston portion 250, in an embodiment of the present invention. In an embodiment of the present invention, groove 212 width is substantially equivalent to a thickness of a hard disk 550 that is subject to a removal process. In alternative embodiments of the present invention, the width of groove 212 may be larger or smaller than a thickness of a hard disk 550. Groove 212 provides for separation of a hard disk 550 from a disk spacer 552 in HDD 500 during a hard disk removal process performed on HDD 500, in an embodiment of the present invention.

Piston portion 250 of positioning alignment pin 200 is shown to further include a surface 280 that is configured for contacting a surface of central spindle hub, e.g., surface 580 of FIG. 5C, during a disk removal process, in an embodiment of the present invention. Piston portion 250 is shown to also include a solid cylindrically shaped extension, e.g., structure 281, that is configured for insertion in opening 581 of hub 540 when hub 540 is configured with a non-protruding portion 583. Piston portion 250 provides alignment of PAP 200 with a central drive hub 540 of an HDD 500 during a disk removal process performed thereon, in an embodiment of the present invention.

Figure 3:
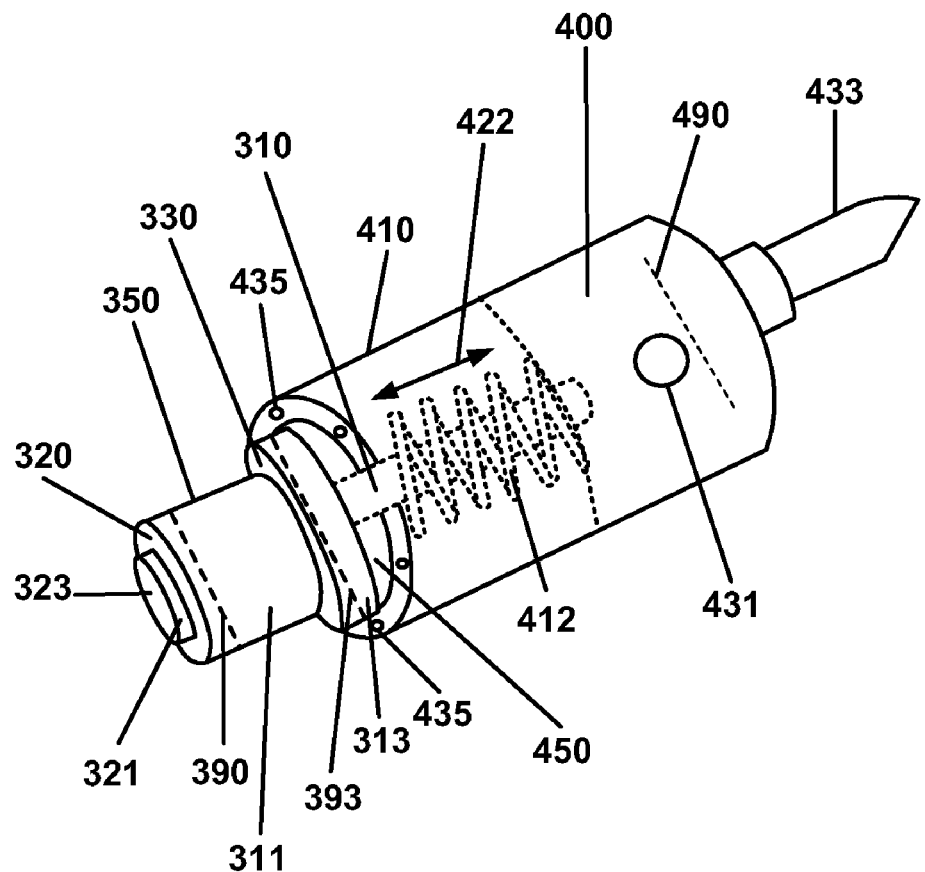
FIG. 3 is an angled view diagram of still another positioning pin and a disk removal tool with which embodiments of the present invention may be practiced, in accordance with an embodiment of the present invention.

FIG. 3 is an angled view diagram of a positioning aligning pin (PAP) 300 configured for utilization in a disk removing tool in conjunction with a disk removal process, in accordance with an embodiment of the present invention. PAP 300 is shown to include a shaft 310 portion and a piston 350 portion. Shaft 310 is configured for removably retained interoperability in conjunction with a disk remover tool 400 of FIGS. 3, 4A, 4B, 6A-6E, in an embodiment of the present invention.

Piston portion 350, coupled to shaft 310, is configured for alignment with a central drive hub of a hard disk drive, e.g., central drive hub 540 of HDD 500 of FIG. 5A-5E and FIGS. 6A-6E, in an embodiment of the present invention. Piston portion 350 is shown having a cylindrical shape 311 with an outer diameter 390 that is substantially equivalent to the outer diameter 590 of a central drive hub 540 of FIG. 5A, and from which hard disks are to be removed, in an embodiment of the present invention. Shape 311 of piston portion 350 of PAP 300, configured for positive alignment with a central spindle hub 540, provides reorientation of a disk spacer 552 to a pre-disk removal position during removal of a hard disk 550. Piston portion 350 is shown to also include a shape 313, interposed between shaft 310 and shape 311, having an outer diameter 393 that is compatible with the inner diameter 490 of inner sleeve 450 of disk removal tool 400, as shown in FIGS. 3 and 6A-6E, in an embodiment of the present invention. Embodiments of the present invention are well suited for utilization in instances when central spindle hub assembly outer diameters differ from inner sleeve diameters of disk removal tools.

Piston portion 350 of PAP 300 of FIG. 3 is shown to have integrated there within an indentation or trough, e.g., groove 312, in an embodiment of the present invention. Groove 312 is shown circumferentially disposed within shape 311 of piston portion 350, in an embodiment of the present invention. In an embodiment of the present invention, groove 312 width is substantially equivalent to a thickness of a hard disk 550 that is subject to a removal process. In alternative embodiments of the present invention, the width of groove 312 may be larger or smaller than a thickness of a hard disk 550. Groove 312 provides for separation of a hard disk 550 from a disk spacer 552 during a hard disk removal process performed on HDD 500, in an embodiment of the present invention.

Piston portion 350 of positioning alignment pin 300 is shown to further include a surface 380 that is configured for contacting a surface of central spindle hub, e.g., surface 580 of FIG. 5C, during a disk removal process, in an embodiment of the present invention. Piston portion 250 is shown to also include a cylindrically shaped hollow extension, e.g., structure 381, in an embodiment of the present invention. Structure 381 is configured for insertion into opening 581 of central drive hub 540 of FIG. 5C, in an embodiment of the present invention. Structure 381 is shown to include a hollow 383 that is configured to receive there within portion 583 of central drive hub 540 of FIG. 5C, in an embodiment of the present invention.

Also shown in FIG. 3 are some of the components associated with an exemplary disk removal mechanism, e.g., disk removal tool 400, with which embodiments of the present invention may be practiced. Disk removal tool 400 includes a housing 410. Coupled to housing 410 is a power switch 431 for activating a suction system (not shown) that is coupled to housing 410 via a suction hose, e.g., hose 433. Housing 410 is shown to have disposed therewithin a spring mechanism 412 for resistive positioning aligning pin 300 retraction during a disk removal process and subsequent repositioning of positioning aligning pin 300 after disk removal, indicated by arrow 422, in an embodiment of the present invention.

Disk removal tool 400 is shown to have a plurality of openings 435 disposed within the structure of housing 410 and terminating on surface 480 of disk removal tool 400. Surface 480 is configured for contact with a hard disk 550 and/or a disk spacer 552 during a disk removal process. Each opening 435 is coupled to hose 433 via a suction tube, hose or other hollowed structure (not shown), providing suction to the terminating ends of openings 435. During operation, suction provided via hose 433 is activated, via power switch 431, and openings 435 enable application of vacuum upon a hard disk 550 and/or a disk spacer 552.

Disk removal tool 400 further includes an inner sleeve 450 disposed with housing 410. Inner sleeve 450 has an inner diameter, generally indicated by line 490, which is compatibly equivalent to outer diameter 393 of shape 313 of PAP 300, in an embodiment of the present invention. It is noted that disk removal tool 400 shown herein includes an inner diameter 490 that differs from an outer diameter 590 of a central drive hub 540.

With reference still to FIG. 3, it is noted that when inner diameter 490 of disk removal tool 400 is equivalent to an outer diameter 590 of a central drive hub 540, embodiments of the present invention, as shown in FIGS. 1 and 2, may be utilized. It is further noted that embodiments of the present invention, as shown in FIGS. 1, 2 and 3, may be singularly implemented, combinationally implemented, and/or nearly infinitely modified for use a positioning aligning pin, e.g., PAP 100, 200, 300 of FIGS. 1, 2 and 3, respectively, and PAP 301 as shown in FIGS. 6A-6E.

Figure 4A:
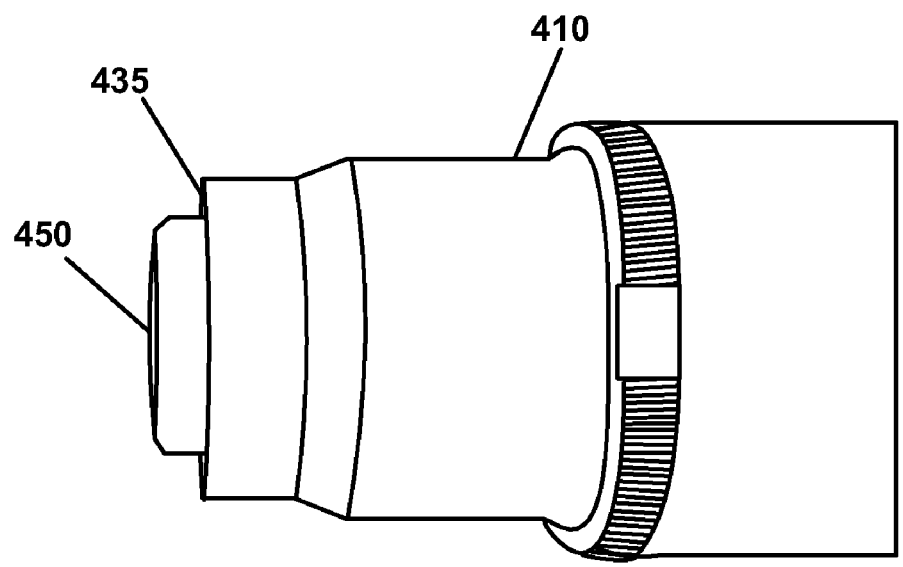
FIG. 4A is a profile image of a disk removal tool with which embodiments of the present invention may be practiced.
Figure 4B:
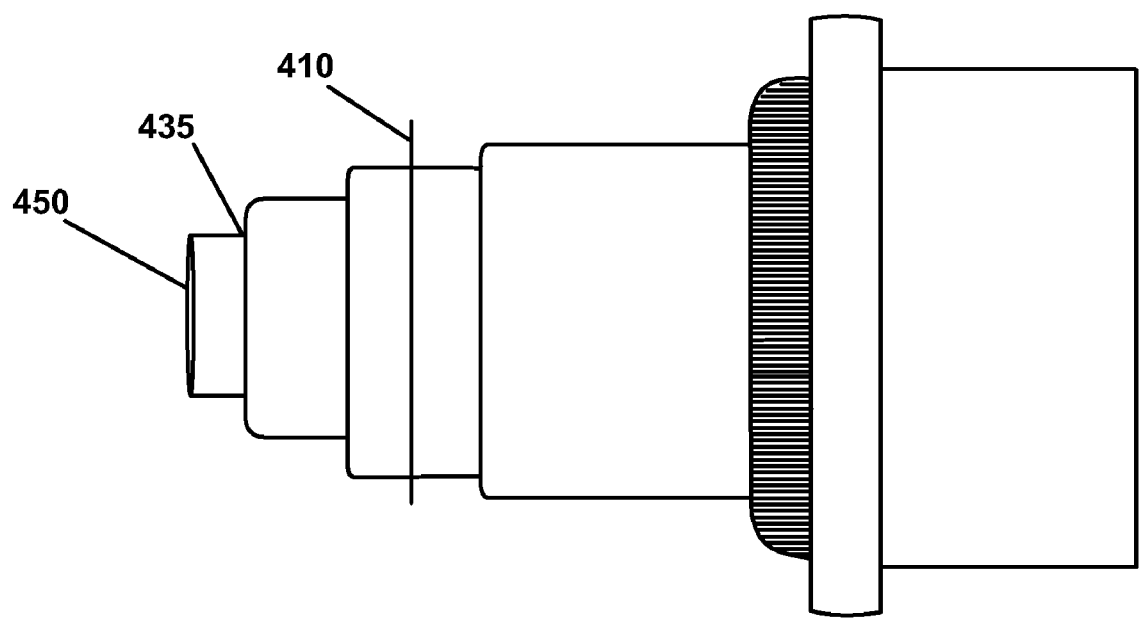
FIG. 4B is a profile image of another disk removal tool with which embodiments of the present invention may be practiced.

With reference now to FIGS. 4A and 4B, shown are profile images of disk removal tools with which embodiments of the present invention may be practiced. FIG. 4A is a disk removal tool 401 having a housing 410, a plurality of openings 435 (not visible) on surface 480, and a blunt nose section 485. FIG. 4B is a disk removal tool 402 having a housing 410, a plurality of openings 435 on surface 480 and a tapered nose section 486.

Embodiments of the present invention are well suited for utilization in those disk removal tools configured for use with diminutive hard disk drives, e.g., disk removal tool 402 of FIG. 4B, and for those disk removal tools configured for use with larger sized hard disk drives, e.g., disk removal tool 401 of FIG. 4A.

FIG. 5A is a schematic drawing of an exemplary embodiment of an information storage system comprising a magnetic hard disk file or hard disk drive (HDD) 500 for a computer system. Hard disk drive 500 has an outer housing or base 513 containing a disk pack having at least one media or magnetic disk 550. A spindle motor assembly having a central drive hub 540 rotates the disk or disks 550. An actuator 521 comprises a plurality of parallel actuator arms 525 (one shown) in the form of a comb that is movably or pivotally mounted to base 513 about a pivot assembly 523. A controller 519 is also mounted to base 513 for selectively moving the comb of arms 525 relative to disk 515.

In the embodiment shown, each arm 525 has extending from it at least one cantilevered electrical lead suspension (ELS) 127 (load beam removed). It should be understood that ELS 127 may be any form of lead suspension that can be used in a data access storage device, such as HDD 500. A magnetic read/write transducer or head is mounted on a slider 529 and secured to a flexure that is flexibly mounted to each ELS 527. The read/write heads magnetically read data from and/or magnetically write data to disk 550. The level of integration called the head gimbal assembly is the head and the slider 529, which are mounted on suspension 527. The slider 529 is usually bonded to the end of ELS 527.

ELS 527 has a spring-like quality, which biases or presses the air-bearing surface of the slider 529 against the disk 550 to cause the slider 529 to fly at a precise distance from the disk 515. ELS 527 has a hinge area that provides for the spring-like quality, and a flexing interconnect (or flexing interconnect) that supports read and write traces through the hinge area. A voice coil 533, free to move within a conventional voice coil motor magnet assembly 534 (top pole not shown), is also mounted to arms 525 opposite the head gimbal assemblies. Movement of the actuator 521 (indicated by arrow 535) by controller 519 causes the head gimbal assemblies to move along radial arcs across tracks on the disk 550 until the heads settle on their set target tracks. The head gimbal assemblies operate in a conventional manner and always move in unison with one another, unless HDD 500 uses multiple independent actuators (not shown) wherein the arms can move independently of one another.

FIG. 5B is an angled view of an exemplary disk stack assembly 551 disposed about a central drive hub 540, having an outer diameter 590, which may be implemented in an HDD 500. In the disk stack assembly shown, there are five analogous hard discs, hard disks 550-1, 550-2, 550-3, 550-4 and 550-5. Interposed between each hard disk 550 is a disk spacer 552. Disk spacers 552 provide necessary clearance for read/write head motion and operation.

FIG. 5C is an angled view of associated clamping components for securing a disk stack about a central drive hub 540. During disk stack assembly, subsequent to disks 550 and disk spacers 552 being placed about central drive hub 540, a top cap 546 is placed on surface 580 of central drive hub 540. Holes 547 in surface 580 are aligned with holes 548 in top cap 546. Subsequently, retention devices, e.g., screws 549, are inserted through the openings 548 in top cap 546 and rotation is applied to drive screws 549 into openings 547 of surface 580 of central drive hub 540, thus securing disks 550 and disk spacers 552 about central drive hub 540 . . . .

Figure 5D:
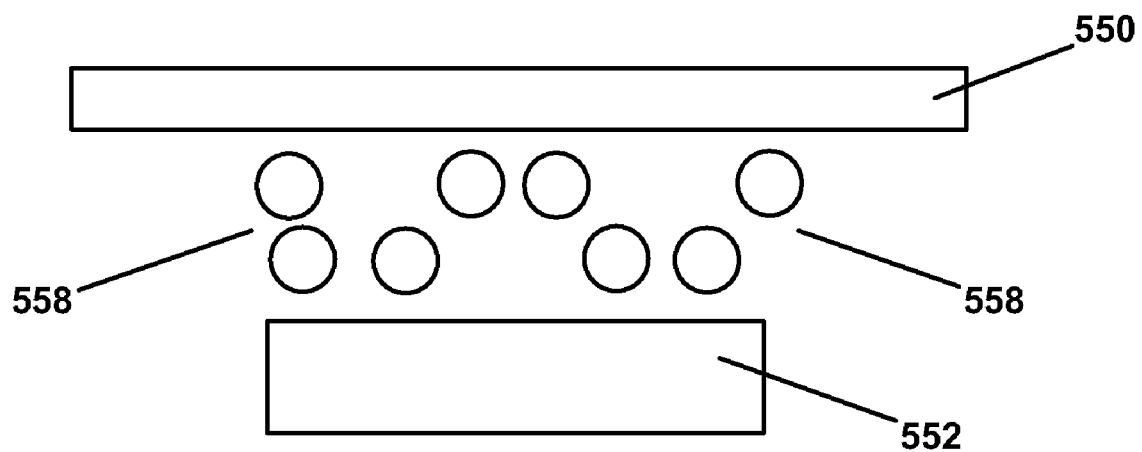
FIG. 5D is an initial block diagram of a disk stack assembly process performed in conjunction with hard disk drive assembly.
Figure 5E:
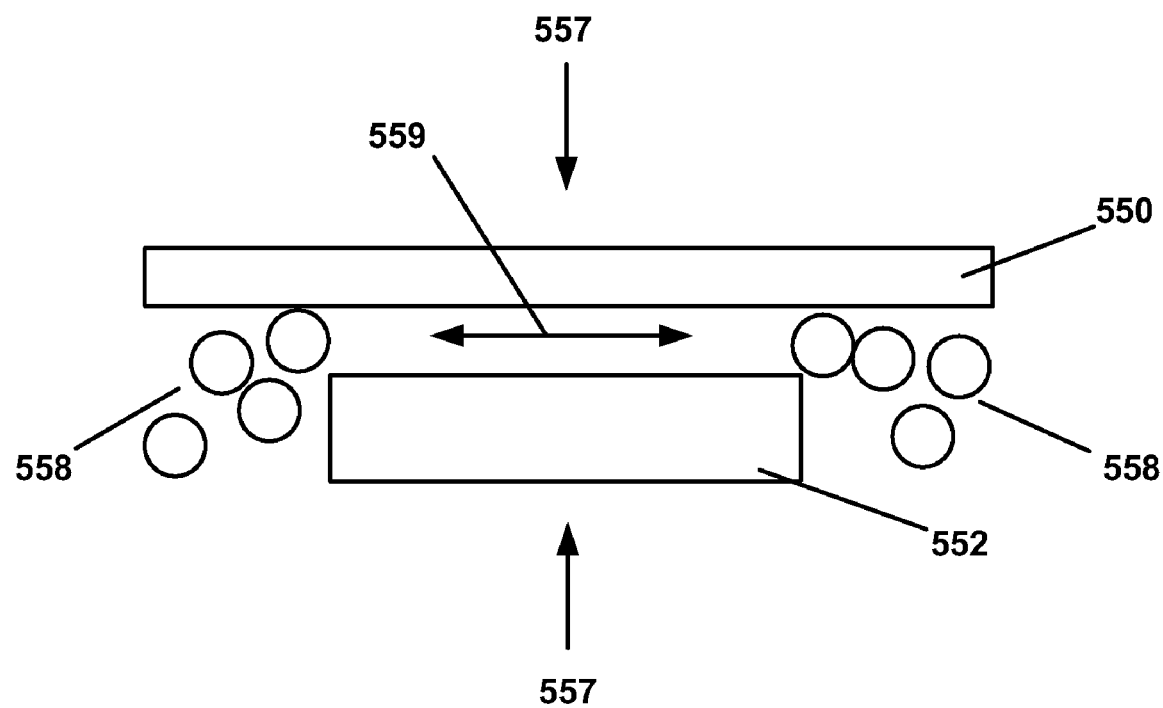
FIG. 5E is a sequential block diagram of the disk stack assembly process of FIG. 5D.
Figure 5F:
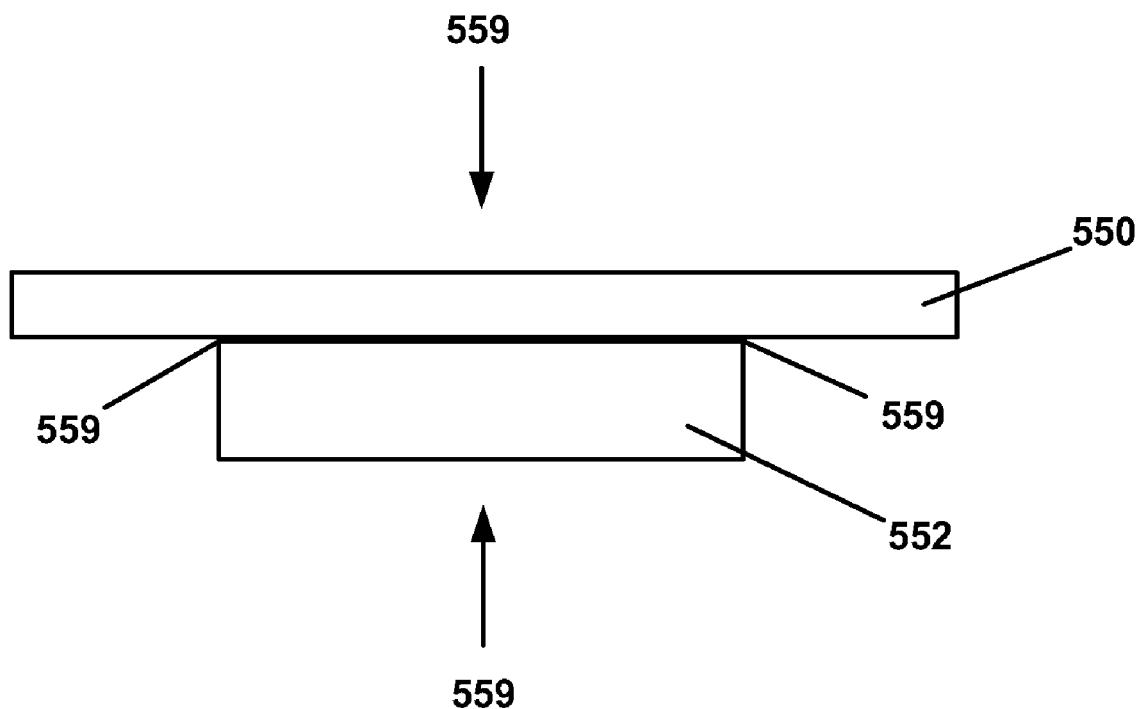
FIG. 5F is a sequential block diagram of the disk stack assembly process of FIG. 5E, and upon which embodiments of the present invention may be practiced.

Referring collectively to FIGS. 5D-5F, shown are a portion of processes for securing a disk stack assembly about a central drive hub. FIG. 5D shows a disk spacer 552 upon which a disk 550 is to be placed. Air 558 is interposed between disk spacer 552 and disk 550.

During a disk stack securing process, as described with reference to FIG. 5C, tightening of screws 549 causes a downward force 556 to be generated upon disk 550. As disk 550 nears and subsequently contacts disk spacer 552, air 558, interposed therebetween, is dispersed outwardly, as indicated by arrow 557.

Referring to FIG. 5F, upon completion of the disk stack securing process, as described with reference to FIGS. 5C and 5E, and by virtue of the downward pressure 556 exerted on disk 550 and disk spacer 552, a surface tension effect 559 is created. Surface tension 559 represents the vacuum effect that may occur when two surfaces, e.g., disk 550 and disk spacer 552, are pressed together.

Disassembly of a hard disk drive 500 includes, in part, removing disks 550 and disk spacers from central drive hub 540. An initial step in the removal process is to remove top cap 546 from surface 580 of central drive hub 540. Screws 549 are removed to facilitate removal of top cap 546, thus enabling removal of disks 550 and disk spacers 552. During removal of disks 550, effect 559 causes both disk 550 and disk spacer 552 to be simultaneously removed. It is surface tension effect 559 at which embodiments of the present invention are directed.

FIGS. 6A-6E are sequential illustrations of a disk stack assembly 551 about a central drive hub 540 upon which a disk removal process is to be performed, in accordance with embodiments of the present invention.

Figure 6A:
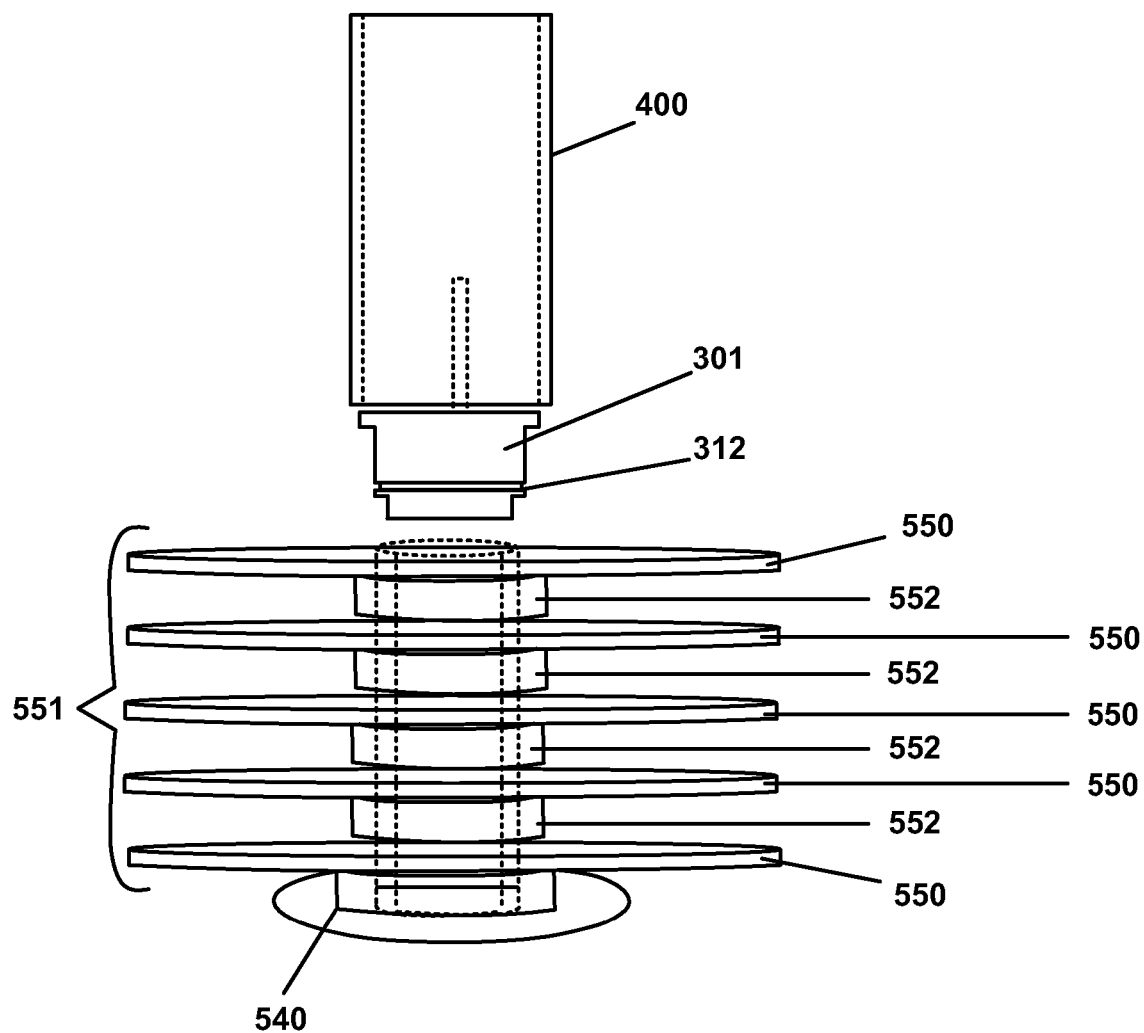
FIG. 6A is an initial block diagram of a disk removal process utilizing a positioning aligning pin, in accordance with an embodiment of the present invention.

FIG. 6A is an initial sequence illustration of a disk removal process 650 performed in accordance with embodiments of the present invention. FIG. 6A includes a disk stack assembly 551 disposed about a central drive hub 540. Central drive hub 540 includes an outer diameter 590. It is noted that top cap 546 and screws 549 have been removed from central drive hub 540, as described herein with reference to FIGS. 5B-5D.

FIG. 6A further includes a disk removal tool 400, as described herein with reference to FIGS. 3, 4A and 4B. Disk removal tool 400 is shown to have coupled therewith a positioning aligning pin (PAP) 301 in accordance with an embodiment of the present invention. PAP 301, similar in design to PAP 300 as described herein with reference to FIG. 3, is shown to include a groove 312, as described herein with reference to groove 112/212 of PAP 100/200 of FIGS. 1/2, respectively, in accordance with an embodiment of the present invention.

Figure 6B:
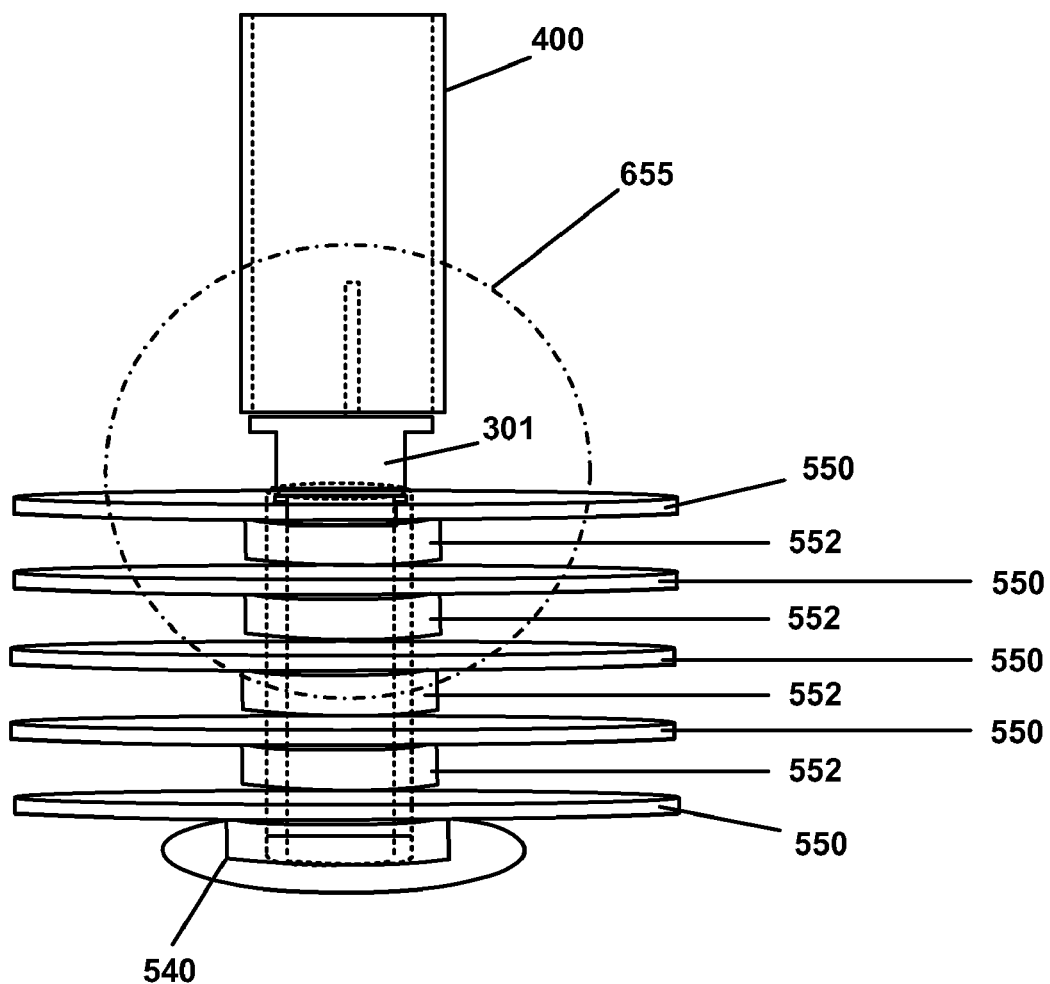
FIG. 6B is a sequential block diagram of the disk removal process of FIG. 6A.

FIG. 6B is a sequential illustration of the disk removal process 650 of FIG. 6A. FIG. 6B shows PAP 301 contacting central drive hub 540, e.g., surface 380 of PAP 301 abutting surface 580 of central drive hub 540, as described herein with reference to FIGS. 3 and 5C, in an embodiment of the present invention. In an embodiment of the present invention, structure 381 of PAP 301 has been inserted into opening 581 of central drive hub 540, while inner protrusion 583 of central drive hub 540 (FIG. 5C) is received in opening 381 of PAP 301, in an embodiment of the present invention. In the present embodiment, structure 381 and opening 383 provide for passively retained positional alignment of PAP 301 with central drive hub 540. In an embodiment of the present invention, outer diameter 590 of central drive hub 540 is substantially equivalent to outer diameter 390 of PAP 301.

Figure 6C:
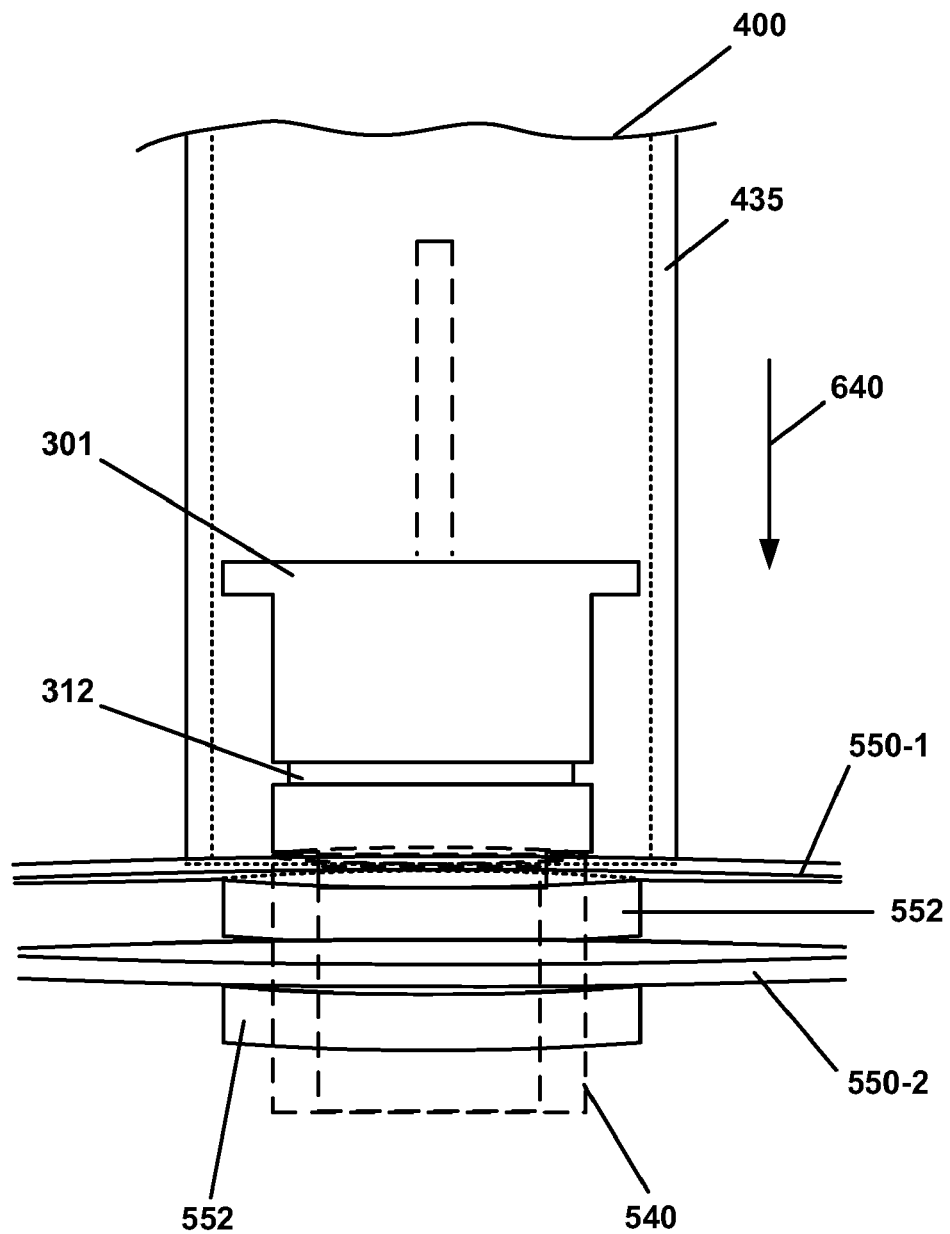
FIG. 6C is a sequential block diagram of the disk removal process of FIG. 6B.

FIG. 6C is an expanded view of region 655 of FIG. 6C in a sequential illustration of the disk removal process 650 of FIG. 6B. FIG. 6C shows surface 480 of disk removal tool 400 in contact with disk 550-1, such that openings 435 are oriented abutting disk 550-1, in an embodiment of the present invention. Downward pressure exerted upon disk removal tool 400, indicated by arrow 640, causes tool 400 to contact disk 550-1 while PAP 301 is retracted into sleeve 450 of tool 400, as described herein with reference to FIG. 3. It is noted that groove 312 is located within sleeve 450 of tool 400. In an embodiment of the present invention, a vacuum system coupled to disk removal tool 400 is activated, as described herein with reference to power switch 431 of FIG. 3 and suction is applied to disk 550-1 via openings 435 of disk removal tool 400.

Figure 6D:
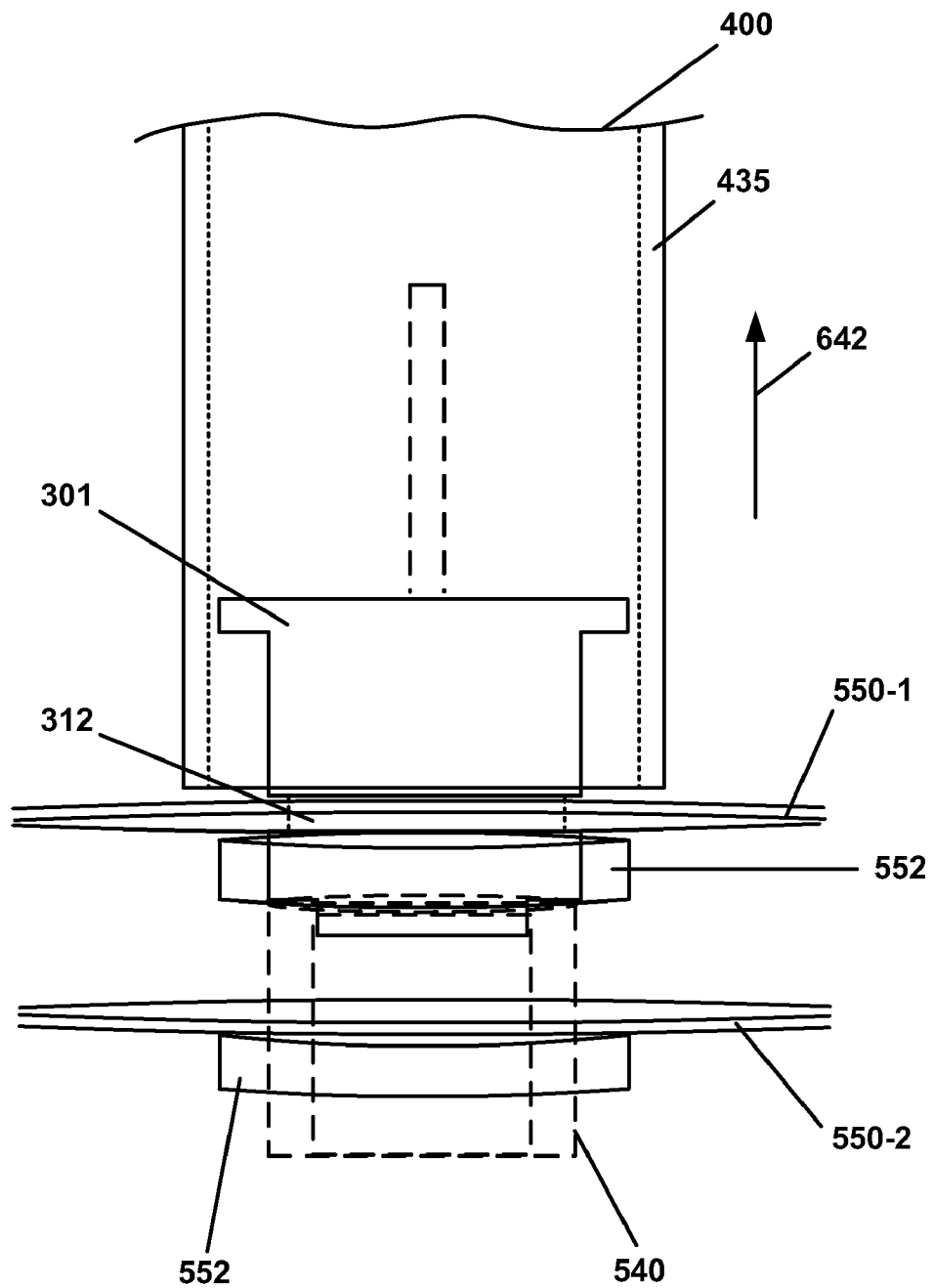
FIG. 6D is a sequential block diagram of the disk removal process of FIG. 6C.

FIG. 6D is a sequential illustration of disk removal process 650 of FIG. 6C. FIG. 6D shows, subsequent to activation of the vacuum system coupled therewith, disk removal tool 400 has been retracted upwardly, as indicated by arrow 642, so as to lift disk 550-1 such that disk 550-1 is aligned with groove 312 of PAP 301, in an embodiment of the present invention. It is noted that surface tension, as described herein with reference to FIG. 5B and FIG. 5C, has caused disk spacer 552 to remain adhered to disk 550-1 during the lifting operation shown herein. It is further noted that in an embodiment of the present invention, surface 380 of PAP 301 remains in contact with surface 580 of central drive hub 540 during the lifting operation.

Figure 6E:
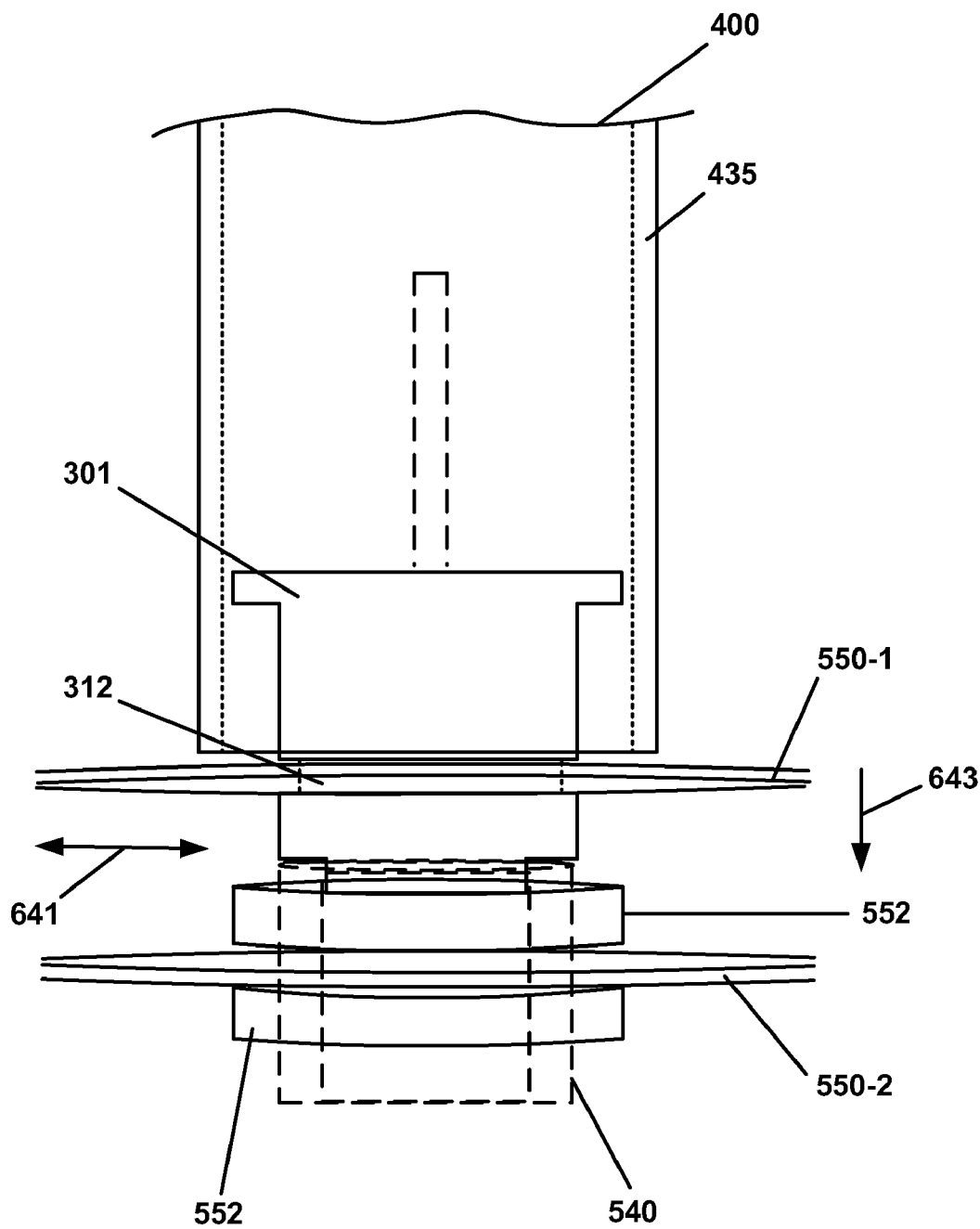
FIG. 6E is a sequential block diagram of the disk removal process of FIG. 6D.

FIG. 6E is a sequential illustration of the disk removal process 650 of FIG. 6D. FIG. 6E shows that disk spacer 552 has nestled downwardly and is now resting upon disk 550-2, subsequent to separation from disk 550-1, in an embodiment of the present invention. Because disk 550-1 is aligned with groove 312 of PAP 301, as described with reference to FIG. 6D, lateral motion of disk 550-1 is enabled, as indicated by arrow 641. Lateral motion 641 was applied to disk 550-1, causing release of surface tension 559, as described herein with reference to FIG. 5F. Releasing surface tension 559 caused disk spacer 552 to separate from disk 550-1. By virtue of diameter 390 of PAP 301, as shown in FIG. 3, substantially equivalent to outer diameter 590 of central drive hub 540, disk spacer 552 has nestled softly downward and is resting upon disk 550-1. Accordingly, disk removal tool 400 can be removed from contact with central drive hub 540 and disk 550-1 can be removed.

Embodiments of the present invention illustrate PAP 100, 200, 300 and 301 of FIGS. 1, 2, 3, 6A-6E as configured for lateral motion of a disk 550 to cause separation. In an alternative embodiment, PAP 100, 200, 300 and 301 may be configured to enable lateral motion of a disk spacer 552 so as to cause separation.

Embodiments of the present invention are illustrated in an environment in which a disk removal tool 400, having a PAP 100, 200, 300, or 301, disposed therewithin, is operator manipulated. In an alternative embodiment of the present invention, are well suited for implementation in environments in which the disk removal tool 400, equipped with a PAP 100, 200, 300 or 301, is robotically and automatedly performed.

Figure 7:
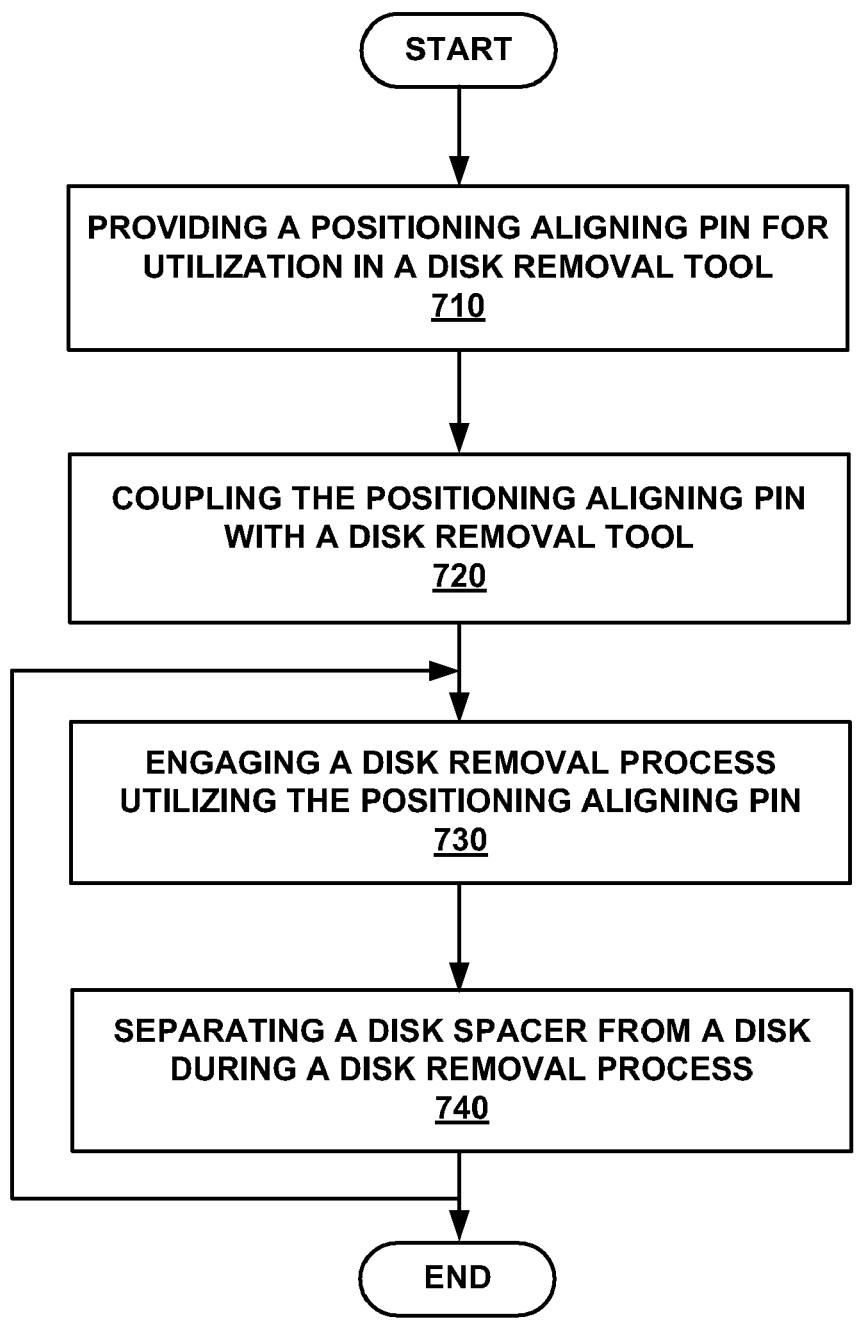
FIG. 7 is a flowchart of a process for removing hard disks from a hard disk drive, in accordance with embodiments of the present invention.

FIG. 7 is a flowchart of a process 700 for disk removal, in accordance with an embodiment of the present invention. FIG. 7 is a flow chart of a process7900 in which particular operations are performed in accordance with an embodiment of the present invention for disk removal. Although specific operations are disclosed in process 700, such operations are exemplary. That is, the present invention is well suited to performing various other operations or variations of the operations recited in FIG. 7. Within the present embodiment, it should be appreciated that the operations of process 700 may be performed by software, by hardware, by an assembly mechanism, through human interaction, or by any combination of software, hardware, assembly mechanism, and human interaction.

Process 700 for disk removal will be described with reference to components and devices shown in FIGS. 1-3, 4A-4B, 5A-5F, and 6A-6E, in accordance with embodiments of the present invention.

In operation 710 of process 700, a positioning aligning pin is provided, e.g., PAP 100, 200, 300 or 301, for utilization in a disk removal process, e.g., disk removal process 650, in an embodiment of the present invention.

In operation 720 of process 700, a positioning aligning pin is coupled to a disk removal tool, e.g., shaft 310 of PAP 300 inserted into a shaft receiver of a disk removal tool 400, as shown in FIG. 3.

In operation 730 of process 700, a disk removal process is engaged, so as to remove hard disks from a hard disk drive, e.g., disks 550 of hard drive 500, utilizing a disk removal tool 400 configured with a PAP 100, 200, 300, or 301 of FIGS. 1-3 and FIGS. 6A-6E, and as described with reference to FIGS. 6A-6B, in an embodiment of the present invention.

In operation 740 of process 700, surface 480 of disk removal tool 400 contacts disk 550-1, such that openings 435 are oriented abutting disk 550-1, in an embodiment of the present invention. Downward pressure is exerted upon disk removal tool 400, indicated by arrow 640 of FIG. 6C, which causes disk removal tool 400 to contact disk 550-1 while PAP 301 is retracted into sleeve 450 of tool 400, as described herein with reference to FIG. 3. In an embodiment of the present invention, a vacuum system coupled to disk removal tool 400 is activated, as described herein with reference to power switch 431 of FIG. 3 and suction is applied to disk 550-1 via openings 435 of disk removal tool 400.

Continuing, subsequent to activation of the vacuum system coupled therewith, disk removal tool 400 is retracted upwardly, as indicated by arrow 642 (FIG. 6D), so as to lift disk 550-1 such that disk 550-1 is aligned with groove 312 of PAP 301, in an embodiment of the present invention. It is noted that surface tension, as described herein with reference to FIG. 5B and FIG. 5C, has caused disk spacer 552 to remain adhered to disk 550-1 during the lifting operation shown herein. It is further noted that in an embodiment of the present invention, surface 380 of PAP 301 remains in contact with surface 580 of central drive hub 540 during the lifting operation.

With reference still to operation 740 of process 700, disk spacer 552 nestles downwardly and subsequently rests upon disk 550-2, subsequent to separation from disk 550-1, in an embodiment of the present invention. Because disk 550-1 is aligned with groove 312 of PAP 301, as described with reference to FIG. 6D, lateral motion of disk 550-1 is enabled, as indicated by arrow 641. Lateral motion 641 was applied to disk 550-1, causing release of surface tension 559, as described herein with reference to FIG. 5F. Releasing surface tension 559 caused disk spacer 552 to separate from disk 550-1. By virtue of diameter 390 of PAP 301, as shown in FIG. 3, substantially equivalent to outer diameter 590 of central drive hub 540, disk spacer 552 has nestled softly downward and is resting upon disk 550-1. Accordingly, disk removal tool 400 can be removed from contact with central drive hub 540 and disk 550-1 can be removed from disk removal tool 400, in an embodiment of the present invention.

In an alternative embodiment of the present invention, a positioning aligning pin (PAP) 100, 200, 300 and/or 301 may be configured with a piston portion 150, 250 and/or 350, respectively, having an outer diameter configured to exert movement resistance during the removal process. In an embodiment of the present invention, outer diameter 190, 290 and/or 390, of PAP 100, 200, 300 and/or 301, may be larger than an outer diameter 590 of central drive hub 540 of HDD 500. It is noted that the increased outer diameter of piston portion 150, 250 and/or 350 does not prevent disks and disk spacers from being removed.

Accordingly, during a disk removal process, movement resistance, caused by the increased piston portion outer diameter, may cause separation of disk 550-1 from disk spacer 552. Because disk spacer 552, when so configured, has a thickness larger than the thickness of a disk 550, during a disk removal process, the amount of movement resistance generated is greater upon disk spacer 552 than upon disk 550. This increased movement resistance can, in turn, cause separation of disk spacer 552 from disk 550-1 during a disk removal process. In accordance with embodiments of the present invention, and subsequent to separation, disk spacer 552 nestles downwardly and rests upon disk 550-2.

It is noted that subsequent to completion of operation 740, process 700 may be terminated or process 700 may be restarted, e.g., returns to operation 730 and is repeated.

Embodiments of the present invention, in the various presented embodiments, provide an apparatus and method for disk spacer drop-proofing during a disk removal process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk removal apparatus for disk removal and comprising:
   a shaft;
   a disk aligner coupled to an end of said shaft, said disk aligner further comprising a sleeve portion, said sleeve portion comprising a diameter for generation of friction upon said disk and said disk spacer when said disk is being removed from said disk stack; and
   a surface de-tensionizer incorporated within said disk aligner, said surface de-tensionizer for disengaging surface tension between a disk and a disk spacer during a disk removal process, wherein said shaft further comprises another end portion insertable in a disk removal device, said another end portion disposed opposite said end of said shaft having said disk aligner.

2. The apparatus as recited in claim 1 wherein said sleeve portion comprises a groove portion incorporated there within.

3. A disk removal apparatus for disk removal and comprising:
   a shaft;
   a disk aligner coupled to an end of said shaft, said disk aligner further comprising a sleeve portion, said sleeve portion comprising a diameter for generation of friction upon said disk and said disk spacer when said disk is being removed from said disk stack; and
   a surface de-tensionizer incorporated within said disk aligner, said surface de-tensionizer for disengaging surface tension between a disk and a disk spacer during a disk removal process, wherein said disk aligner further comprises:
   a positioning portion configured to align said component with a hub of said disk drive.

4. The apparatus as recited in claim 3 wherein positioning portion further comprises:
   a hollow disposed on said positioning portion for encompassing a portion of said hub.

\* \* \* \* \*

UNITED STATES PATENT AND TRADEMARK OFFICE
CERTIFICATE OF CORRECTION

PATENT NO. : 8,261,432 B2
APPLICATION NO. : 12/179488
DATED : September 11, 2012
INVENTOR(S) : Kesirin Bunlusin et al.

Page 1 of 1

It is certified that error appears in the above-identified patent and that said Letters Patent is hereby corrected as shown below:

On the Title page, item (56) OTHER PUBLICATIONS: Delete: "Maxupgrades, "MaxConnect Lite CPU Bay Disk Drive Mounting Assembly [PolyAcetal] for G5 Power Macs (PCI-X)", http://www.maxupgrades.com/istore/index.cfm?fuseaction=product_ID=136, (2007), 1-3."

Insert -- Maxupgrades, "MaxConnect Lite CPU Bay Disk Drive Mounting Assembly [PolyAcetal] for G5 Power Macs (PCI-X)", http://www.maxupgrades.com/istore/index.cfm?fuseaction=product.display&Product_ID=136, (2007), 1-3. --

Signed and Sealed this
Eleventh Day of June, 2013

Teresa Stanek Rea
*Acting Director of the United States Patent and Trademark Office*